United States Patent
Drane, Jr. et al.

[15] 3,704,464
[45] Nov. 28, 1972

[54] METHOD OF SUPPRESSING SELECTED ANTENNA RADIATION PATTERN SIDE LOBES WHILE RETAINING MAXIMUM DIRECTIVE GAIN

[72] Inventors: Charles J. Drane, Jr., Cambridge; John F. McIlvenna, Jr., Lynn, both of Mass.

[73] Assignees: The United States of America as represented by the Secretary of the Air Force

[22] Filed: Nov. 10, 1970

[21] Appl. No.: 88,355

[52] U.S. Cl. ............................343/100 LE
[51] Int. Cl. ............................H01 3/26
[58] Field of Search ...................343/100 LE

[56] References Cited

UNITED STATES PATENTS 3,182,330  5/1965  Blume................343/100 LE

Primary Examiner—Benjamin A. Borchelt
Assistant Examiner—Denis H. McCabe
Attorney—Harry A. Herbert, Jr., Willard R. Matthews, Jr.

[57] ABSTRACT

A method for maximizing aerial directive gain while simultaneously placing nulls (suppressing side lobes) in the far-field radiation pattern of the array. The expressions of the standard antenna gain equation that define the side lobes to be eliminated are equated to zero and solved for current phase and amplitude values. A new set of current values for the standard directive gain equation are derived through a transform operator that includes the derived phase and amplitude values. Techniques substantially identical are used to maximize a standard gain equation utilizing the new set of current values. The current phase and amplitude values derived from the maximization step are used to feed the antenna.

1 Claim, 6 Drawing Figures

INVENTORS
CHARLES J. DRANE Jr. AND
JOHN F. McILVENNA Jr.
BY Harry A. Herbert Jr. and
Willard R. Matthews
ATTORNEYS 3,704,464

METHOD OF SUPPRESSING SELECTED ANTENNA RADIATION PATTERN SIDE LOBES WHILE RETAINING MAXIMUM DIRECTIVE GAIN

BACKGROUND OF THE INVENTION

This invention relates to antenna far-field pattern control and more particularly to a novel method of achieving for any given antenna the maximum directive gain possible for any selected radiation pattern.

The frequent need to discriminate between closely spaced radar targets has led to considerable interest in the development of high-resolution, high-gain radar aerials. Both resolution and gain are describable in terms of the radiation pattern of the aerial. High resolving power implies that the pattern has a narrow main beam and low side-lobes, while high directive gain implies a large amount of energy radiated by the aerial in the direction towards which the beam points, relative to the total energy radiated. This paper considers a technique for achieving maximum gain for aerial arrays whose radiation patterns must satisfy constraints on the location of null values that control the beamwidth and/or side-lobe levels of the pattern.

These two problems, gain maximization and radiation pattern beam-shaping, are usually considered separately. In the former, generally little attention is given to the radiation pattern structure that results from the maximization procedure. For example, for linear arrays (in which the elements are located along a straight line), associated with the maximum gain solution is a pattern with a relatively high side-lobe structure that makes this solution somewhat unattractive; such high side-lobes could cause undesirable interference in target discrimination. In beam-shaping operations on the otherhand, control over the pattern structure is the prime objective, but one often obtains such control only at a significant sacrifice in gain.

It is then the purpose of this invention to provide means that jointly permit gain maximization and beam shaping. Applications calling for such techniques include the following problems. Firstly, there are often in radio communications links the simultaneous design goals of maximum gain in the direction of some distant transmitter and/or receiver and the reduction or elimination of interference or jamming from other directions. Secondly, in radio astronomy it is often desirable to use an aerial that can reduce the signal from a strong source and at the same time produce maximum gain in the direction of a nearby weaker source of interest. Finally, in a real life tactical environment, aerial siting is seldom optimum, and reflexions from natural or man-made objects can interfere with operations (as, for example, the interference experienced by an aerial from other aerials on board ship). In all these applications it is desirable to minimize the deleterious effects perhaps by placing pattern nulls in the directions of the interference while at the same time radiating and/or receiving, as the case may be, maximum energy in the direction of the desired target or signal.

SUMMARY OF THE INVENTION

The present invention comprises a method for maximizing aerial directive gain while simultaneously placing nulls in the far-field radiation pattern of the array. The technique is applicable to aerial arrays of N elements arbitrarily positioned and permits specification of directions of up to N−1 independent pattern nulls and/or side-lobes, while providing maximum gain in some prescribed direction. This control is achieved by varying only the amplitude and phase of the element currents. The method can be used even when non-isotropic aerial elements and interelement mutual coupling effects are included in the expression for directive gain. In essence, the method of the invention comprehends adjusting the current values of the standard antenna directive gain formula to reflect the effects of selected side lobe discrimination and maximizing the formulation so adjusted. The resultant current phase and amplitude values are then used in the antenna feed to provide the desired pattern and directive gain.

It is a principal object of the invention to provide a method for maximizing antenna directive gain that is applicable to an array of N aerial elements that are arbitrarily located in three-dimensional space and that permits specifications of arbitrary directions for up to a total of N−1 pattern nulls and/or side lobe positions.

It is another object of the invention to provide a general matrix method for maximizing the ratio of quadratic forms that are subject to constraints.

It is still another object of the invention to provide a simplification in the number of mathematical operations and/or equations necessary to provide numerical values.

These, together with other objects, features and advantages of the invention, will become more readily apparent from the following detailed description taken in conjunction with the accompanying drawings.

DESCRIPTION OF PREFERRED EMBODIMENT

The following detailed description of the invention utilizes many commonly used symbols. Table I is here presented to define the principal symbols used.

TABLE I

| Symbol | Definition |
|---|---|
| N | number of array elements |
| M | number of pattern constraints |
| Superscript * | complex conjugate |
| Superscript + | complex conjugate transpose of a vector or a matrix |
| Superscript T | transpose of a vector or matrix |
| $d_n$ | location of nth element in array |
| $\mu$ | $\cos \theta$ where $\theta$ is measured from line of array |

| | |
|---|---|
| $\lambda$ | wavelength |
| $\gamma$ | eigenvalue |
| $E(\mu)$ | far-field amplitude radiation pattern |
| $G$ | directive gain of the array |
| $\overline{A}$ and $\overline{B}$ | (N × N) square matrices occuring in numerator and denominator, respectively, of the gain formula |
| $+$ | |
| $I$ | an N-element column vector with the element currents as entries |
| $p$ | one of the M prespecified constraint vectors |
| $\overline{P}$ | (N × N) constraint matrix constructed from $p$ vectors |
| $\mathbf{I}$ | an N-element transformed current vector |
| $\overline{A}_t$ and $\overline{B}_t$ | (N × N) numerator and denominator matrices of the transformed gain formula |
| $\overline{A}_a$ and $\overline{B}_a$ | (N − M) × (N − M) abridged matrices formed by deleting the first M rows and M columns of $\overline{A}_t$ and $\overline{B}_t$ |
| $\Gamma$ | constrained gain. |

Although the discussion below is to be limited to aerial directive gain, the techniques outlined are generally applicable to a much wider class of problems. Other quality criteria for aerial arrays, such as power gain, signal/noise ratio, gain-bandwidth product and aerial Q-factor can be similarly handled. Even in circuit problems in electrical engineering, for example the maximization of the ratio of the power dissipated in an N-port load to that dissipated in the internal impedances of the N feeding generators, these techniques can be applied.

There is summarized here the results of a recent matrix approach to aerial array optimization. It serves as the basis for the constraint technique outlined in the description of the method of the invention.

The directive gain, often used as an indicator of overall array performance, is defined as $$G = 4\pi \frac{\text{power radiated in a particular direction}}{\text{total power radiated}} \quad (1)$$

Figure 1:
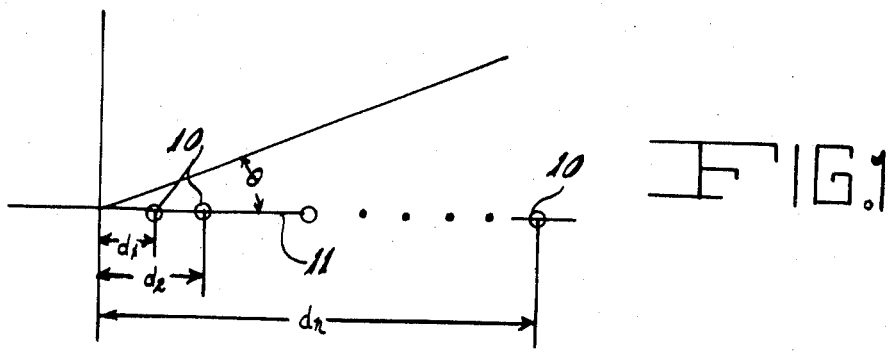
FIG. 1 schematically illustrates an antenna array of the type to which the method of the present invention can be applied.

For a linear array, such as that shown in FIG. 1 with N isotropic elements 10 arbitrarily spaced along a line 11, the far-field amplitude radiation pattern is (to within a constant factor) given by $$E(\mu) = \sum_{n=1}^{N} I_n e^{-jD_n\mu},$$

where $D_n = (2\pi/\lambda) d_n$, $\mu = \cos\theta$ and the $I_n$ are the complex element excitation coefficients, amplitude and phase. The power radiated in a particular direction, $\mu_o$, is $$P(\mu_0) = |E(\mu_0)|^2 = \sum_{n=1}^{N} \sum_{m=1}^{N} I_n I_m^* e^{j(D_m-D_n)\mu_0},$$

which the reader will recognize as a quadratic form; the symbol * denotes complex conjugate. Arranging the currents in an N-element column vector I, $$I = \begin{bmatrix} I_1 \\ I_2 \\ \vdots \\ I_N \end{bmatrix}$$

and defining a square (N × N) matrix $\overline{A}$, with elements
$A_{mn} = e^{j(D_m-D_n)\mu_0}$, $1 \leq m, n \leq N$, leads to the more familiar matrix formulation
$P(\mu_o) = I + \overline{A}I$,
with + denoting the combined operations of complex conjugation and transposition. Note that $\overline{A}$ is a Hermitian matrix, i.e. $A_{mn} = A^*_{nm}$ and that, in addition, it is a one-term dyad, i.e. it can be expressed as the outer product of two column vectors
$\overline{A} = \alpha\alpha +$,
where $$\alpha = \begin{bmatrix} e^{jD_1\mu_0} \\ e^{jD_2\mu_0} \\ \vdots \\ e^{jD_N\mu_0} \end{bmatrix}$$

(This property of $\overline{A}$ will lead to a significant simplification in finding the maximum directive gain.)

The total power radiated by the aerial is that contained in the power pattern and is given by $$P_T = 2\pi \int_{-1}^{+1} |E(\mu)|^2 d\mu = 2\pi \sum_{n=1}^{N} \sum_{m=1}^{N} I_n I_m^* \int_{-1}^{+1} e^{j(D_m-D_n)\mu} d\mu$$

or $$P_T = 4\pi \sum_{n=1}^{N} \sum_{m=1}^{N} I_n I_m^* \frac{\sin(D_m-D_n)}{(D_m-D_n)}$$

We define the (N × N) matrix $\overline{B}$ with elements $$B_{mn} = \frac{\sin(D_m-D_n)}{(D_m-D_n)}$$

(Note that $\overline{B}$ is real, symmetric, and positive definite.) Then,
$P_T = 4\pi(I + \overline{B}I)$,
equation (1) for aerial directive gain becomes a ratio of quadratic forms
$$G = I + \overline{A}I/I + \overline{B}I \quad (2)$$
and the usual goal is to find the currents which maximize G.

There are other equivalent forms for directive gain but the representation in equation (2) has at least two distinct advantages. First, necessary calculations are readily performed on a digital computer using standard library routines for the matrix operations. Second, and most important, is that the extremal values, of quality criteria cast in this form, can be determined quite simply. This result is based on a theorem which states that with $\overline{A}$ and $\overline{B}$ Hermitian and $\overline{B}$ positive definite, all the relative maxima and minima of the ratio are given by the eigenvalues determined from
$\overline{A}I = \gamma\overline{B}I$,
where $\gamma$ denotes the eigenvalues which must satisfy
$det(\overline{A} - \gamma\overline{B}) = 0$.
The vectors $\{I\}$ which produce these extrema, are the corresponding eigenvectors.

The case of directive gain (and other quality criteria) is especially simple. Since $\overline{A}$ is a one-term dyad, all but one of the eigenvalues of the gain ratio are zero. This one non-zero eigenvalue is, in fact, the maximum gain and is given by
$G_{max} = \gamma_1 = \alpha + \overline{B}^{-1}\alpha$.
The corresponding eigenvector, representing the currents which produce this maximum gain, is
$I = \overline{B}^{-1}\alpha$ These two results provide an elegant and compact solution for the maximization of directive gain and other quality criteria. This formulation has been extensively used to study maximum gain arrays with, however, no constraints on the aerial radiation pattern behavior. The following description will show how the notion of pattern constraints can be introduced in a way which preserves the compactness and simplicity of the matrix approach.

The general problem of the maximization or minimization of a quantity that is subject to constraints is quite often approached by the method of Lagrange multipliers. This traditional approach has in fact been used in several studies of aerial optimization including the maximization of gain subject to constraints on the supergain ratio and the beam efficiency and, more recently, the maximization of gain with constraints on the pattern behavior. The Lagrange technique is characterized by the fact that as the number of applied constraints increases, so also does the complexity of the manipulations required for a solution. The constraint technique outlined below, however, actually reduces the matrix dimensions by exactly the number of constraints applied and can provide, therefore, an important simplification as far as computer operations are concerned.

The constraints take the form of setting either the pattern value and/or the pattern derivative value to zero in certain directions. The former locates nulls, the latter side-lobes in the resulting constrained pattern. Others have developed techniques for placing nulls in the radiation pattern, although some of these methods are applicable only to uniformly spaced arrays and none of them is coupled to a simultaneous maximization of the gain in the constrained pattern. Let us now outline a maximum gain-constraint technique.

For the situation in FIG. 1, the array factor, which for isotropic elements is the radiation pattern, is given by $$E(\mu) = \sum_{n=1}^{N} I_n e^{-jD_n\mu}$$

Setting the pattern equal to zero in the directions $\mu_i$ where $i = 1, 2 \ldots M$, $0 \leq M \leq (N-1)$, produces a set of M linear, homogeneous equations in the currents $I_n$:

$$\left\{ \sum_{n=1}^{N} I_n e^{-jD_n\mu_i} = 0 \right\}, i=1,2, \ldots M.$$

The left hand sides of each of these constraint equations can be expressed as the inner product of a constraint vector $p_i$ $$p_i^T = \{ e^{-jD_{1\mu_i}}, e^{-jD_{2\mu_i}}, \ldots e^{-jD_{N\mu_i}} \}, \quad i=1,2,\ldots M$$

and the current vector I. Or, setting the pattern derivative equal to zero in certain directions gives rise to the equations $$\left\{ \sum_{n=1}^{N} (-jD_n) I_n e^{-jD_n\mu_i} = 0 \right\}, i=1,2, \ldots M$$

and thus locates side-lobe positions. The overall restrictions on the constraint technique are that the constraint equations must be linear, independent, and above all, homogeneous. The last restriction will be shown to be important so far as retention of the form common to the unconstrained problem is concerned.

In accordance with the method of the invention there is first formed a constraint matrix $\overline{C}$, with N rows and N columns. Each of the first M rows in $\overline{C}$ consists of one of the constraint vectors $p_i$; the remaining $(N-M)$ rows are filled with any arbitrary collection of N element, independent vectors. A new normalized constraint matrix $\overline{P}$, orthogonal by rows and columns, i.e. $\overline{P}+ = \overline{P}^{-1}$, is generated by using the Gram-Schmidt or equivalent procedure on the matrix $\overline{C}$. A transformation can now be defined $$I = \overline{P} + 1 \quad \text{or } 1 = \overline{P}I, \quad (3)$$

which when applied to equation (2) gives:

$$G = \frac{I^+(\overline{PAP}^+)I}{I^+(\overline{PBP}^+)I} = \frac{I^+\overline{A}_c I}{I^+\overline{B}_c I}$$

where I is an N element column vector and $\overline{A}_c$ and $\overline{B}_c$ are, of course, square $(N \times N)$ matrices. It will hereafter be shown that this form permits several significant simplifications.

The orthogonalization procedure is of such a nature that each of the first M rows in $\overline{P}$ turns out to be a linear combination of the original constraint vectors $\{p_i\}$. The definition of I in equation (3) shows that each of the first M entries in I is therefore some linear combination of the original constraint equations, all of which however were homogeneous. It follows that the first M entries in I are zeros. This means that in equation (4) one can discard the first M entries in I (we call this abridged vector $I_a$) and therefore the first M rows and M columns of $\overline{A}_c$ and $\overline{B}_c$. The resulting abridged form for gain, incorporating all the constraint effects, is $$\Gamma = I_a + \overline{A}_a I_a / I_a + \overline{B}_a I_a \quad (5)$$

where now $\overline{A}_a$ and $\overline{B}_a$ are square matrices, reduced in dimensions to $(N-M)$ by $(N-M)$. This reduction in dimensions is consistent with intuitive notions that constraints always reduce the number of degrees of freedom of the variable involved in the system. It is important to note that the formula for gain subject to these homogenea constraints remains the ratio of two quadratic forms.

It can be shown that a typical element in $\overline{A}_c$ is $$A_c^{mn} = \sum_{k=1}^{N} \sum_{j=1}^{N} P_{mk} A_{kj} P^*_{nj}, \quad 1 \leq m, n \leq N. \quad (6)$$

Note that
$A_c^{mn} = (A_c^{nm})^*$ (where * denotes complex conjugate); hence $\overline{A}_c$ is Hermitian. $\overline{B}_c$ has the same property. Since $\overline{A}_a$ and $\overline{B}_a$ are formed by deleting the first M rows and M columns of $\overline{A}_c$ and $\overline{B}_c$, $\overline{A}_a$ and $\overline{B}_a$ will likewise be Hermitian.

It has been seen that the quadratic form appearing in the denominator of equation (2), representing as it does the total power in the radiation pattern, must be positive definite. So also must be the quadratic form associated with the matrix $\overline{B}_c$, obtained from the other quadratic form merely by the transformation given in equation (3). The matrices $\overline{B}$, $\overline{B}_c$, and therefore also the abridged matrix $\overline{B}_a$ must be positive definite. Finally note that $$\overline{A}_c = \overline{P}\overline{A}\overline{P} + = \overline{P}(\alpha\alpha+)\overline{P} += (\overline{P}\alpha)(\overline{P}\alpha)+ = \alpha_c \alpha_c \ ,$$

so that like $\overline{A}$, $\overline{A}_c$ is a one-term dyad. A little thought shows that deletion of M rows and M columns of $\overline{A}_c$ to form $\overline{A}_a$ is equivalent to deleting the first M entries in the vector $\alpha_c$ (we call this abridged vector $\alpha_a$). Thus $$A_a = \alpha_a \alpha_a^+$$

where it can be shown that $$\alpha_a^T = \left\{ \sum_{k=1}^{N} P_{M+1,k} e^{j\mu_0 D_k}, \sum_{k=1}^{N} P_{M+2,k} e^{j\mu_0 D_k} \ldots, \sum_{k=1}^{N} P_{N,k} e^{j\mu_0 D_k} \right\}.$$

Thus the transformation from equation (2) to equation (5) has introduced the pattern constraints in a manner which leaves intact the form of the expressions for gain, and reduces the dimensions of the matrices involved. In addition, all the simple matrix operations used to compute the maximum gain and the corresponding current distribution remain valid here. For there is again but one non-zero eigenvalue; it is now the maximum gain of the array subject to the pattern constraints and, referring to the result quoted in the preceding section, is given by:

$$\Gamma^{max} = \gamma_1^c = \alpha_a + \overline{B}_a^{-1} \alpha_a. \qquad (7)$$

The corresponding eigenvector is found from $$I_a^{max} = \overline{B}_a^{-1} \alpha_a,$$

and the current distribution, $I_c^{max}$, associated with this maximum constrained gain is obtained by equation (3). But if it is recalled that the N-element column vector $I$ is always formed from the (N − M)-element column vector $I_a$ by inserting zeros for the first M elements of $I$ and following these with the (N−M) elements of $I_a$, equation (3) in this case simplifies to $$I_c^{max} = \overline{P}_d + I_a^{max},$$

where the (N − M) × N matrix $\overline{P}_d$ is obtained from the (N × N) matrix $\overline{P}$ by deletion of the first M rows.

When the eigenvalues (positive semidefinite) are ordered according to their numerical size, it can be shown that in any generally constrained system the eigenvalues have an 'interleaved' relationship with the unconstrained eigenvalues. That is, if a general form such as equation (1) is subjected to, say, a single constraint, (M = 1), the set of unconstrained eigenvalues $\{\gamma_i\}$, $i = 1,2, \ldots N$, and the set of constrained eigenvalues $\{\gamma_i^c\}$, $i = 1,2,\ldots (N-1)$, are related as $$\gamma_1 \geq \gamma_1^c \geq \gamma_2 \geq \gamma_2^c \geq \cdots \geq \gamma_{N-1}^c \geq \gamma_N.$$

In the case of gain, only $\gamma_1$ and $\gamma_1^c$ are non-zero, implying the important result that $$\Gamma^{max} \leq G^{max}.$$

It is of interest to the array designer to minimize the amount of gain he must sacrifice to achieve some desired degree of pattern control. Some examples of this technique will be discussed below.

It is important to state here in passing that mutual coupling and element factor effects can be included in the gain formulation in a variety of equivalent ways. For the purposes of this description, we need only note that with mutual effects and even element losses accounted for, gain can still be represented as the ratio of two quadratic forms, possessing all the necessary Hermitian, positive definite and dyadic properties described up to now. The elements in the numerator and denominator matrices are otherwise different, but in a non-essential way.

It is well known that maximum gain is associated with a uniform current distribution across the elements. In this sense, the maximum gain constraint technique represents the smallest possible deviation from uniform current illumination that will place the pattern nulls as desired. This trend toward uniform illumination means that the excitation currents cannot oscillate wildly (a situation encountered in superdirective aerials) and insures that the maximum gain current distributions can be realized in practice. Keeping the illumination as uniform as possible is also an aid in calculating and accounting for mutual coupling effects.

To provide a valid basis for comparison of constrained and unconstrained maximum gain patterns, the maximum gain (uniformly illuminated) broadside pattern of a 20-element array, spaced uniformly at 0.5·λ, with gain of 20., is used as a reference pattern. The selection of this spacing, number of elements and broadside operation is solely for demonstration and does not imply any restrictions on the constraint technique itself. All patterns presented are normalized by their largest value.

Figure 2:
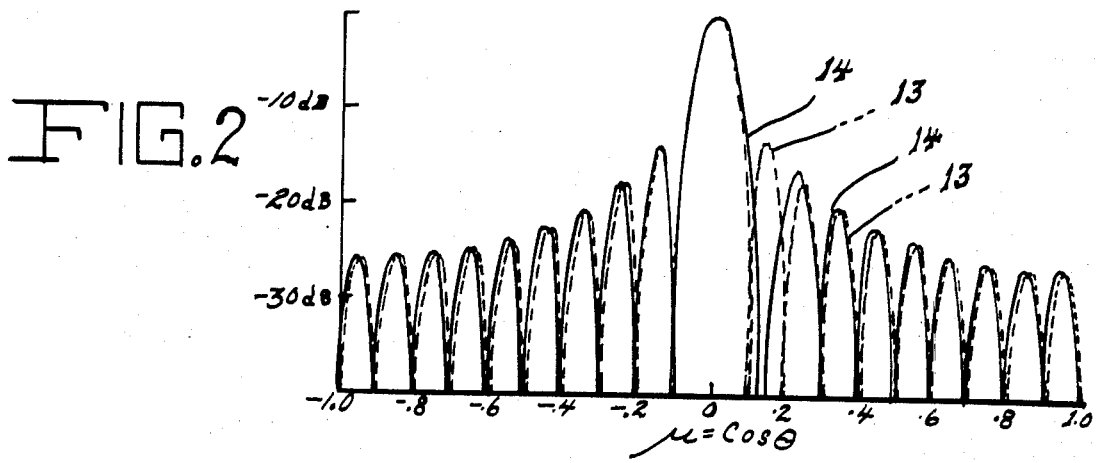
FIG. 2 illustrates the field pattern of an antenna using a single pattern constraint to replace a peak with a null.

As a first simple demonstration one might consider eliminating a secondary peak of the unconstrained pattern by setting a null in that direction while requiring maximum broadside gain. The result is shown in FIG. 2 by unconstrained pattern 13 and constrained pattern 14. Note that the side-lobe structure is nearly unchanged over most of the pattern, and the gain has decreased only slightly to 19.04.

If additional peaks were to be set to nulls, the gain would drop correspondingly. Some quantitative results, demonstrating typical gain losses, are shown in Table II for broadside arrays of eight and 20 elements having various spacings.

TABLE II

| elements | Spacing | max gain unconstrained | Max gain w/first side-lobe peak at null | max gain w/two peaks at nulls | Gain for a Chebyshev w/-30 dB side-lobes |
|---|---|---|---|---|---|
| 8 | 0.90λ | 13.35 | 12.62 | 11.92 | 10.91 |
| 8 | 0.50λ | 8.0 | 7.57 | 7.20 | 6.76 |
| 20 | 0.955λ | 35.7 | 34.12 | 32.5 | 31.09 |
| 20 | 0.50λ | 20.0 | 19.04 | 18.15 | 17.38 |

The Chebyshev gains are included to show gain losses that might be encountered by simply depressing all side-lobes to say, − 30 dB. The purpose of this comparison is to ascertain whether or not, as an alternative to the technique proposed in this paper, it would be preferable to choose the element excitation coefficients that result in all side-lobes being below some value at which their interference in the operation of the main beam is assuredly minimal. Such an alternative leads to a very definite reduction in gain relative to the optimum solution. It is also important to realize that the dynamic range of the required Chebyshev excitation coefficients (or the coefficients of any other design whose side-lobes are as low) can be excessive and perhaps even unattainable in practice, whereas the maximum gain excitations on the other hand are more nearly uniform. The Chebyshev solution represents complete pattern control over the whole side-lobe region, and as such it is an over-specification of the problem that can be costly in terms of gain. The optimum solution, on the other hand, restricts the pattern only where necessary (those directions corresponding to unwanted interference or reflections), so that in other regions, where it is constraint-free, the pattern will assume a reasonable shape consistent with the attainment of maximum gain.

Figure 3:
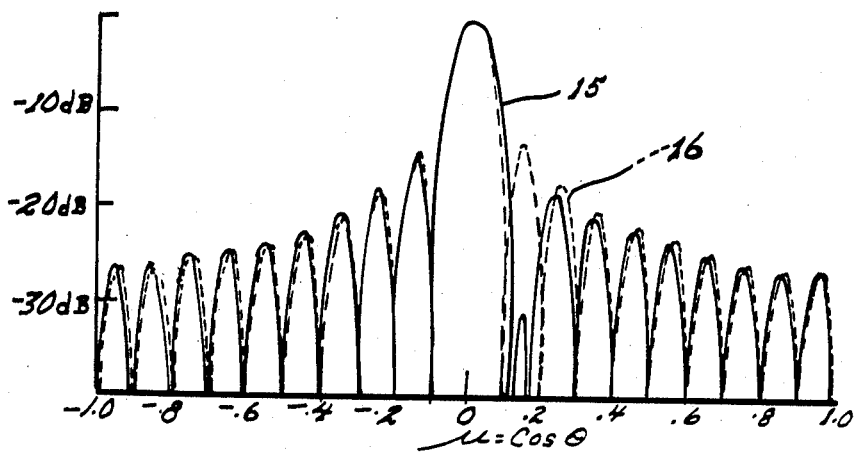
FIG. 3 illustrates the field pattern of an antenna using two pattern constraints to reduce the radiation level in an angular sector.
Figure 4:
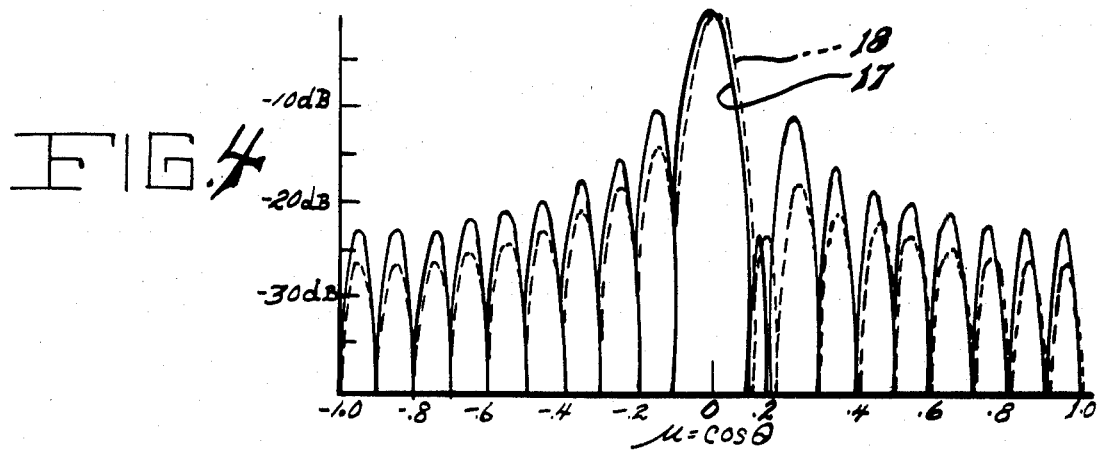
FIG. 4 illustrate the field pattern of an antenna using constraints to control the radiation in an angular sector either with or without the beamwidth fixed.

Also, the proper placement of two adjacent nulls can be used to control the side-lobe level in some angular sector. (This objective becomes especially attractive for those applications in which, say, the source of interference is of some angular extent, or fairly broadband operation is envisioned.) A comparison of constrained pattern 15 and unconstrained pattern 16 in FIGURE 3 shows the results of moving closer together the FIG. two nulls to the right of the broadside direction of the unconstrained pattern. This side-lobe suppression (to −31 dB from − 13.5 dB unconstrained) is achieved with only a slight decrease in gain, i.e. 20.0 to 19.2. Note that in FIGS. 2 and 3, there have been slight increases in the null-to-null beamwidth. If operating conditions are such that one cannot tolerate even this small amount of beam broadening, he can preserve the desired beamwidth through the constraint process simply by using the known first nulls as additional constraints. Of course, there is some price to pay in gain! The comparison of constrained pattern 17 and unconstrained pattern 18 in FIG. 4 shows a comparison of patterns obtained by depressing the side-lobe level to about −24 dB, with the beamwidth constrained in one case and unconstrained in another. The technique used here was to move the second null closer to the origin while holding the beamwidth between first nulls fixed. (Other variations are of course possible!) The constrained beamwidth pattern 17 has a gain of 18.4 compared to a gain of 19.4 when the beamwidth is unconstrained. One could, of course, completely eliminate the peak while maintaining the beamwidth. The gain for this situation is 18.06 compared to 19.04 with the beamwidth unconstrained.

The variations of this approach are endless and these few results demonstrate some of the gain maximizing corrective techniques that can be applied to a given pattern. Of note is the fact that the starting or unconstrained pattern remains relatively unaffected over most of its range and that gain losses, at least with a few constraints applied, are not very severe. Although the use of constraints will, in general, decrease the directive gain, one should not conclude that gain losses always increase with the number of constraints applied. Depending on the particular case, two constraints may well reduce the gain by an amount less than one constraint does. For example, a single constraint used as in FIG. 2 decreased the gain to 19.04 while the two constraints used in FIG. 3 caused the gain to drop only to 19.2.

As the number of array elements increases, the negative effect of a few constraints on gain should become less pronounced. That is, the relocation of a few of these nulls should affect to a lesser extent patterns with a relatively large number of peaks and nulls than patterns with but a few nulls. This is supported by the results shown in Table II, although the differences between eight and 20 elements are expectedly slight.

Figure 5:
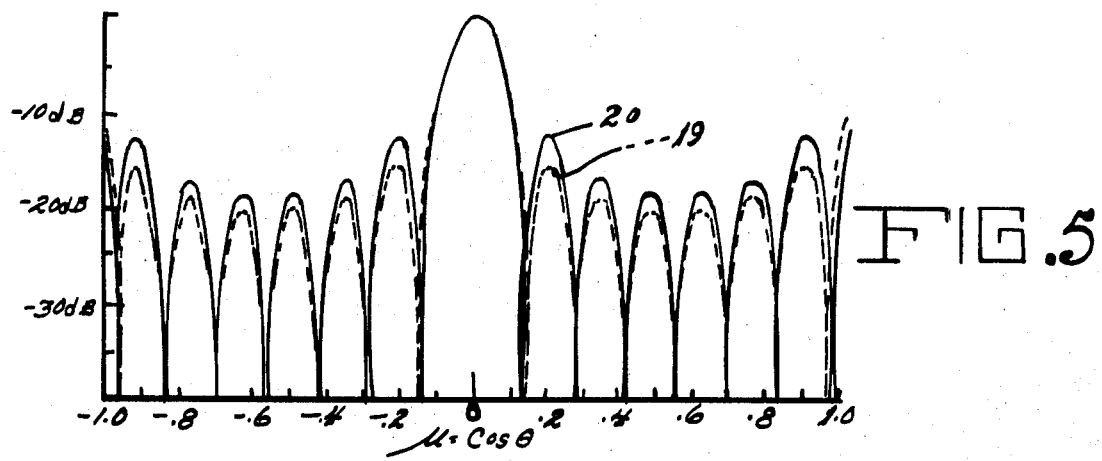
FIG. 5 illustrates the field pattern of an eight element antenna array using constraints to modify the end-fire radiation of the maximum gain; and, FIG. 6 illustrates the field pattern of an antenna array whose beam direction is not always coincident with the direction chosen for maximization of gain.

Maximum gain in uniformly spaced broadside arrays occurs with interelement spacings that are an appreciable fraction of a wavelength. This results in radiation patterns with high end-values at $\mu = \pm 1.0$, higher in fact than any interior sidelobes. Even though such patterns provide maximum gain, such pattern behavior is usually undesirable. Some other spacing could perhaps be used, and if for example, the usual $\lambda/2$ spacing is selected, the corresponding gain loss (13.35 at $0.9\lambda$ spacing for an eight-element array down to 8.0 at $0.5\lambda$) can be appreciable. A use for the constraint method then could be to depress the high endfire radiation, to some acceptable level while obtaining a broadside gain higher than that at $0.5\lambda$ spacing. Comparison of constrained pattern 20 and unconstrained pattern 19 of FIG. 5 shows the effects of moving the last nulls of the unconstrained, eight-element pattern (elements spaced at $0.9\lambda$), closed to $\mu = \pm 1.0$. Note that the end value has been reduced to a level which is about equal to the highest interior side-lobe and the corresponding gain is still 13.07. Further movement of the nulls in the direction of endfire will serve to further reduce the end values but the inner side-lobes will increase somewhat and the gain will decrease. In passing, one should perhaps note that for spacings of $\lambda/2$ or $\lambda$ the two directions $\mu = \pm 1.0$ are the only directions in which one cannot exactly place a null. For these spacings the constraint vectors $p_1$ become a non-independent set and the null-placing technique fails. For other spacings, placing nulls precisely at $\mu = \pm 1.0$ involves one in problems of maintaining computational accuracy.

In all of this discussion, only one or two nulls have been relocated to improve pattern characteristics. It is just as simple to use several nulls simultaneously; for some applications this will result in considerably improved patterns.

These cases demonstrate the advantages of a technique which couples null placement with maximum gain, especially for situations in which aerial element relocation is difficult or impossible to arrange.

The constraint method has uses other than the corrective type alluded to above. With it, one can investigate the basic properties of maximum gain patterns. For example, one customarily links maximum gain to narrow beam widths with the feeling that the narrower the beam, the higher the gain. Actually, the energy squeezed from the main beam redistributes itself in the side-lobe structure. Recalling that directive gain involves an integral over all of the radiation pattern, it is not obvious that the gain will increase as the beamwidth decreases. To investigate this point further, the interelement spacing was held fixed and the constraint method was used to move the first two nulls of the maximum gain patterns closer together, thus narrowing the beamwidth. But the gain, in fact, decreases as the beam gets narrower implying that to improve the beamwidth of any maximum gain pattern, one must sacrifice gain. (As the nulls are moved further into the main beam itself, the cost in gain is, expectedly, very high. For example, in an eight-element array, with a beam one-third of the unconstrained beamwidth, gain drops from 13.35 to 0.32 and the pattern is a many-lobed structure. Such results indicate, however, that with this technique, pattern nulls can be placed in almost any direction.) From the constraint method point of view, the decrease in gain is predictable, since, as seen earlier, any constraints on the unconstrained, maximum gain pattern will reduce the gain. Ideally then, maximum gain will be obtained if one chooses that number of elements, their spacings and a uniform excitation such that he obtains a pattern with its nulls occurring naturally in the directions of the interfering signals. As pointed out earlier however, conditions may not allow the complete freedom necessary to accomplish this goal and the constraint technique becomes a very attractive alternative.

Figure 6:
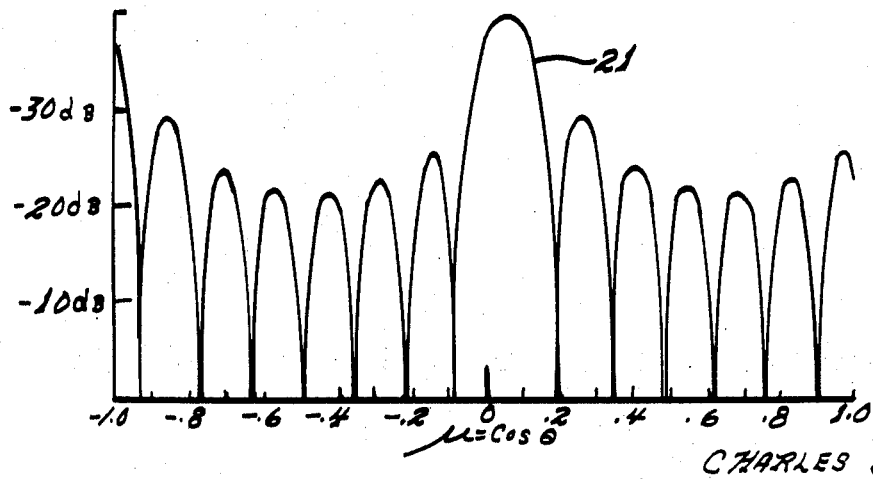

Some calculations for other than broadside situations were also performed. For an eight-element array, spaced uniformly at $\lambda/2$ and with no constraints placed on the pattern, the maximum off-broadside gain pattern is simply the maximum broadside gain pattern, shifted to point in the desired direction by means of a linear phase taper modification of the element currents. That is, the gain does not change with scanning. If $0.9\lambda$ spacing is used, however, the gain drops rapidly with scan angle, because the large endfire radiation associated with this spacing begins to intrude into the visible region. Neither of these results is unexpected! An interesting case however occurs if one plots the unconstrained pattern for maximum gain at 86° as shown by pattern 21 of FIG. 6. Contrary to intuition, the beam is not pointing exactly at 86°! The explanation here is simply that at this spacing, pointing the beam exactly in the maximum gain direction brings the large endfire peak too far into the visible range, and the overall effect is a decrease in gain. Gain is of course the ratio of power in a given direction to the total power radiated.

One thinks of maximizing this ratio by making the numerator of equation (2) as large as possible, i.e. by pointing the beam in the desired direction. The phenomenon above demonstrates that the denominator factor can in fact dominate the numerator and decrease the gain even though the numerator is as large as possible. This denominator behavior will only occur for scanned patterns with significant endfire radiation.

A general matrix method for maximizing the ratio of two quadratic forms that are subject to constraints has been disclosed and applied to the specific case of aerial directive gain. (The very same method can be used, without modification, in the optimization of other quantities such as signal/noise ratio or aerial power gain.) The constraint technique, applicable even when mutual coupling effects are accounted for, is an attractive way of making corrective alterations to the radiation pattern structure in a manner which, at the same time, assures maximum gain. Alternatively, the method can be used to synthesize the maximum gain pattern corresponding to a given placement of desired pattern nulls and/or side-lobe locations. It can be shown that the excitation currents are unique whether the aerial pattern for maximum gain is constrained or not.

While the invention has been described with reference to a particular application and with reference to a particular structure it is to be understood that the words that have been used are words of description rather than of limitation and that changes within the purview of the appended claims may be made without departing from the true scope and spirit of the invention in its broader aspects.

What is claimed is:

1. The method of simultaneously suppressing selected side lobes and retaining maximum directive gain in an antenna comprising the steps of
   determining from the standard gain formula for said antenna the current amplitude and phase values that equate the expressions defining said selected side lobes to zero,
   transforming the current values of said standard gain formula by an operator that includes said current amplitude and phase values to obtain a new set of current values that incorporate the effects thereof,
   determining the current values that provide maximum directive gain for a standard gain formula utilizing said transformed current values, and
   feeding said antenna with said current values.

* * * * *